…

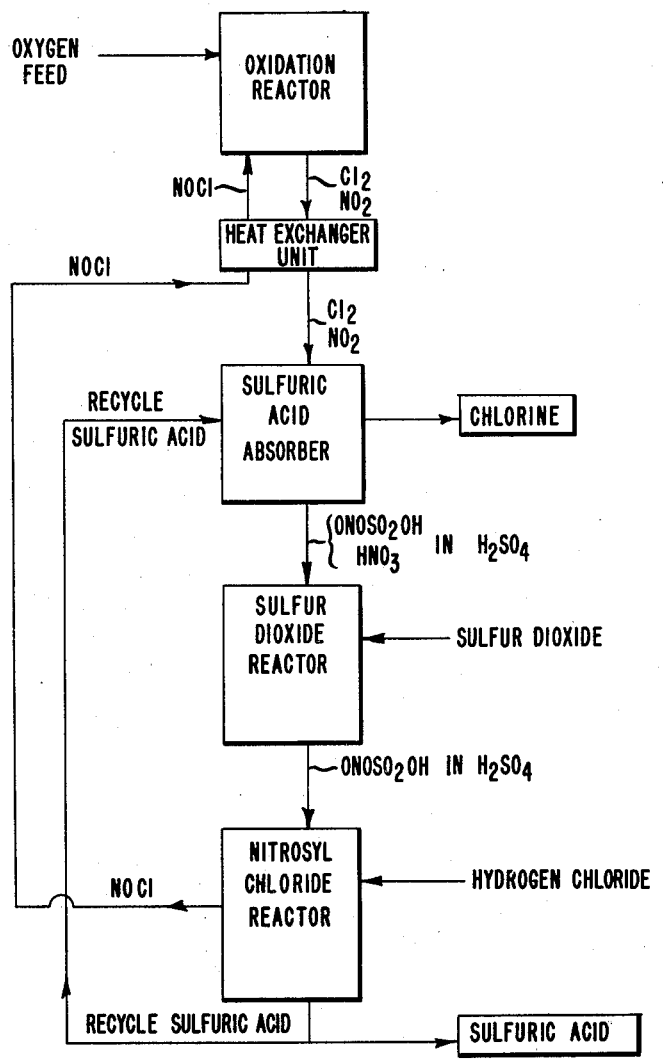

United States Patent Office 3,152,866
Patented Oct. 13, 1964

3,152,866
CYCLIC PROCESS FOR CONVERTING HYDROGEN CHLORIDE TO ELEMENTAL CHLORINE AND SULFUR DIOXIDE TO SULFURIC ACID
Jonas Kamlet, deceased, late of New York, N.Y., by Edna Yadven Kamlet, executrix, New York, N.Y., assignor to E. I. du Pont de Nemours and Company
Filed Feb. 2, 1961, Ser. No. 86,829
22 Claims. (Cl. 23—167)

This invention relates to a cyclic process and more particularly to a cyclic process for the conversion of hydrogen chloride and sulfur dioxide to chlorine and sulfuric acid.

Considerable quantities of gaseous hydrogen chloride are widely available at numerous chemical plants, often as by-products and co-products of organic or inorganic chlorinations. Very often, the disposal of this hydrogen chloride represents a very serious problem and the commercial feasibility of many industrial chemical processes may indeed depend on the profitable utilization of this material.

It is an object of the present invention to provide an economically attractive cyclic process whereby hydrogen chloride can be converted to elemental chlorine, either as a high purity gas which can be compressed, liquefied and shipped in cylinders, or as a dilute chlorine-containing gas which may be used for further organic or inorganic chlorinations. It is a further object to provide a process for the oxidation of a hydrogen chloride reaction product to chlorine wherein a feed stream containing sulfur dioxide is converted to a valuable co-product of sulfuric acid. Other objects will appear hereinafter.

The basis of this invention, which is a cyclic process, may best be understood by a seriatim discussion and description of the various steps of the process, and by reference to the appended flow sheet.

The process basically involves four steps:

(a) In the first step, nitrosyl chloride gas (recycled from a succeeding step) is oxidized with oxygen, or an oxygen-containing gas (such as air) to admixture of $NO_2$ and $Cl_2$:

$$2NOCl + O_2 \rightarrow 2NO_2 + Cl_2$$

(b) In the second step, the mixture of nitrogen dioxide ($NO_2$) and chlorine is scrubbed through a sulfuric acid solution which absorbs the $NO_2$ and allows the chlorine to pass through unreacted, thus effecting a separation. The $NO_2$ reacts with the sulfuric acid to form a mixture of nitrosylsulfuric acid and nitric acid.

$$2NO_2 + H_2SO_4 \rightarrow ONOSO_2OH + HNO_3$$

(c) In the third step, the mixture of nitrosylsulfuric acid and nitric acid is reated with sulfur dioxide, or a sulfur dioxide-containing gas, to convert the nitric acid present in said mixture to nitrosylsulfuric acid:

$$HNO_3 + SO_2 \rightarrow ONOSO_2OH$$

(d) In the fourth step, the nitrosylsulfuric acid (formed in the second and third steps) is reacted with the hydrogen chloride (which is the starting material feed for the process) to form nitrosyl chloride and sulfuric acid:

$$ONOSO_2OH + HCl \rightarrow NOCl + H_2SO_4$$

The nitrosyl chloride formed is recycled to the first step of this process and at least part of the sulfuric acid is recycled to the second step of the process.

Thus, the steps of this process may be represented by the following equations:

Step 1: $2NOCL + O_2 \rightarrow 2NO_2 + Cl_2$
Step 2: $2NO_2 + H_2SO_4 \rightarrow ONOSO_2OH + HNO_3$
Step 3: $ONOSO_2OH + HNO_3 + SO_2 \rightarrow 2ONOSO_2OH$
Step 4: $2ONOSO_2OH + 2HCl \rightarrow 2NOCl + 2H_2SO_4$ and the overall reaction of the process may be represented:

$$2HCl + SO_2 + O_2 \rightarrow Cl_2 + H_2SO_4$$

The oxygen (or oxygen-containing gas) is introduced in the cyclic process in the first step for the oxidation of the NOCl. The hydrogen chloride gas feed is introduced into the cyclic process in the fourth step, where NOCl is formed and recycled to the first step. The sulfur dioxide is introduced into the cyclic process in the third step, where it reacts with the nitric acid present to form nitrosylsulfuric acid. The chlorine is recovered in the second step, in the course of the separation of $NO_2$ from $Cl_2$ by absorption of the former in sulfuric acid. Part of the sulfuric acid formed in the fourth step is drawn off and the remainder of the sulfuric acid is recycled to the second step, for use in the separation of the $NO_2$ from the chlorine.

FIRST STEP.—OXIDATION OF NITROSYL CHLORIDE

The oxidation of NOCl to $NO_2$ and $Cl_2$ has been very extensively described. In this regard attention is directed to U.S. Patents 1,899,123; 2,004,663; 2,130,519; 2,150,- 669; 2,185,579; 2,296,762; 2,296,763; British Patents 383,506; 398,187; 406,553; 430,386; French Patents 731,- 230; 757,307; addition 44,983; German Patents 587,109; 643,104; 666,185; Netherlands Patent 34,856.

This oxidation may be effected at temperatures as low as 20° C., but the reaction rate is excessively low at this temperature, in the absence of catalysts. Below 190° C., in the absence of catalysts, very little oxidation occurs. Between 190° C. and 300° C., substantial oxidation will occur in the absence of catalysts. Above 300° C., the decomposition of NOCl into NO and $Cl_2$ becomes appreciable and the oxidation of the NO to $NO_2$ readily occurs. Between 300° C. and about 500° C., the oxidation of NOCl to $NO_2$ and $Cl_2$ proceeds at a satisfactory rate. The oxidation of a mixture of NOCl with the theoretical volume of oxygen proceeds at the following rates (space-velocity 250 to 300).

| Temperature: | Percent NOCl oxidized to $NO_2$ and $Cl_2$ |
|---|---|
| 150° C. | 4.5 |
| 200° C. | 19.5 |
| 300° C. | 76.0 |
| 400° C. | 87.0 |
| 500° C. | 91.5 |

The decomposition of NOCl above 300° C. is endothermic: $2NOCl \rightarrow 2NO + Cl_2 - 9000$ cal., whereas the oxidation of NO to $NO_2$ is an exothermic reaction:

$$2NO + O_2 \rightarrow 2NO_2 + 13{,}600 \text{ cal.}$$

so that the overall reaction:

$$2NOCl + O_2 \rightarrow 2NO_2 + Cl_2 + 4{,}600 \text{ cal.}$$

is exothermic.

The oxidation of the NOCl may be effected below 190° C. in the presence of catalysts, such as pumice, silica gel, alumina or chabazite, or metal oxides such as $MnO_2$, iron oxides and chromium oxides.

However, for the purposes of this process, it is preferred to effect the oxidation of the NOCl with oxygen in the absence of catalysts, at temperatures between 300° C. and 450° C.

It must be emphasized however, that the oxidation of the NOCl to $NO_2$ and $Cl_2$ in the process of this invention may be effected at any temperature between 20° C. and 500° C., in the presence of catalysts at temperatures between 20° C. and 190° C., and in the presence of catalysts or absence of catalysts at temperatures between 190° C. and 500° C., by any of the procedures described in the prior art. This invention is not to be limited to any specific method or manner for oxidizing the NOCl in that any of the procedures of the prior art may be used.

The prior art describes several procedures for effecting this oxidation. The calculation of converter size for this oxidation has been discussed in Thermochemical Calculations, McGraw-Hill (1941), page 243. For example, the mixture of NOCl and oxygen (or the oxygen-containing gas) may be introduced into a tower, reaction chamber or reaction tube containing bubbling plates, Raschig rings or a similar packing material, maintained within the desired temperature range. Packing within the reaction chamber is by no means essential, but may provide better turbulence of the gas mixture feed. It is not intended that the invention be limited in any manner to specific equipment design for effecting the various steps of this process inasmuch as a wide latitude of design is permissible in each step.

The oxidizing gas may be oxygen, or an oxygen-containing gas (such as air). If air is used, the resultant mixture of $NO_2$ and $Cl_2$ obtained will also be diluted with the inerts in the air (i.e., the nitrogen, $CO_2$, rare gases). After separating the $NO_2$ in the succeeding step, the chlorine obtained will be relatively dilute. This dilute chlorine may be ideally suited for use in organic or inorganic chlorinations. In many chlorinations, the chlorine must be diluted (e.g., with air or inert gases) to moderate the exothermicity of the reaction. The dilute chlorine thus obtained (using air as the oxidant for the NOCl) is thus ideally suited for such uses.

However, if high-strength chlorine is desired (e.g., for compression, liquefaction and shipment), it is desirable to use pure oxygen (i.e., 95% $O_2$ or purer) in this oxidation. In order to minimize carry-over of oxygen into the end-product chlorine obtained, it is preferred to use a stoichiometric deficit of oxygen. This is, however, by no means essential.

Thus, oxidizing a mixture of 1.0 volume of NOCl and 0.4 volume of oxygen (measured under standard conditions) (theory requires 0.5 volume of $O_2$ per 1.0 volume of NOCl) at 400° C., through a packed tube at a space velocity of 200 to 300, gives a product assaying by volume about 14%–15% of unreacted NOCl, 56%–58% of $NO_2$ and 28%–30% of chlorine, which is substantially free of oxygen. The use of a stoichiometric deficit of oxygen in this oxidation results in almost complete consumption of the oxygen in the oxidation step.

Similarly, the oxidation of a mixture of 1.0 volume of NOCl and 2.0 volumes of air (this represents 80% of the theoretical amount of oxygen), at 400°–425° C., through a packed tube at a space velocity of 250 to 400, gives a product assaying by volume about 6.5%–7.0% of unreacted NOCl, 26.0%–27.0% of $NO_2$, 13.0% to 13.5% of chlorine and 53.0%–54.0% of the inert gases introduced with the air (chiefly $N_2$ and $CO_2$), which is also substantially free of oxygen.

In addition, it must be mentioned that the NOCl fed to the oxidation reactor will also contain minor amounts of hydrogen chloride (evolved together with the NOCl in the fourth step of the process). This HCl will dilute the oxidation gases somewhat, and is simply recycled, together with the products obtained in this oxidation step, to the second step of this process.

The oxidation product gases, containing $NO_2$, chlorine, some unreacted NOCl and some HCl and (only in the case where air rather than oxygen has been used) inerts, is then passed to the second step of the process. It is desirable to pass these hot oxidation gases through a heat-exchange unit, where they may be used to preheat the NOCl which is fed to the oxidation reactor.

SECOND STEP.—SEPARATION OF THE $NO_2$ FROM THE $Cl_2$

The gas mixture, above described, preferably after cooling by passage through a heat-exchange unit, is now passed through or scrubbed with sulfuric acid, which will effect a complete separation of the $NO_2$ from the $Cl_2$.

The sulfuric acid employed in this step of the process may vary in concentration from 59.5% $H_2SO_4$ (density at 20°/4° C.—1.70) to 100.0% $H_2SO_4$ (density at 20°/4° C.—1.83). It is preferred to employ sulfuric acid of 90% to 100% $H_2SO_4$ concentration, although this range is by no means critical.

Sulfuric acid, between 59.5% to 100.0% $H_2SO_4$ in concentration, will very effectively and quantitatively separate the $NO_2$ from the $Cl_2$ in the gas mixture. This separation is effected at temperatures between 0° C. and 60° C., and preferably between 25° C. and 35° C.

The sulfuric acid reacts with the $NO_2$ in the gas mixture to form nitrosylsulfuric acid and nitric acid:

$$2NO_2 + H_2SO_4 \rightarrow ONOSO_2OH + HNO_3$$

The chlorine passes through unreacted. With sulfuric acids of 90%–100% $H_2SO_4$ concentration, this chlorine is substantially free of moisture. When oxygen has been used as the oxidant in the first step, this chlorine is 98.0%–99.5% pure, and may be compressed, liquefied and shipped. When air has been used as the oxidant in the first step, this moisture-free chlorine is obtained as a gas containing about 19% to 20% of chlorine by volume, the remainder of the gas being largely nitrogen and carbon dioxide.

Since the oxidation product gases from the first step also contain minor amounts of NOCl and HCl, the behavior of these compounds, on being scrubbed through sulfuric acid at 0° C. to 60° C. may be considered.

The unreacted NOCl in the gases reacts with some of the $NO_2$ present in the gases, and with sulfuric acid, according to the equation:

$$2NOCl + 2NO_2 + 4H_2SO_4 \rightarrow Cl_2 + 4ONOSO_2OH + 2H_2O$$

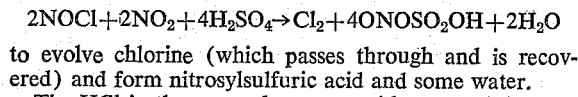

to evolve chlorine (which passes through and is recovered) and form nitrosylsulfuric acid and some water.

The HCl in the gases also reacts with some of the $NO_2$ present in the gases, and with sulfuric acid, according to the equation:

$$2HCl + 2NO_2 + 2H_2SO_4 \rightarrow Cl_2 + 2ONOSO_2OH + 2H_2O$$

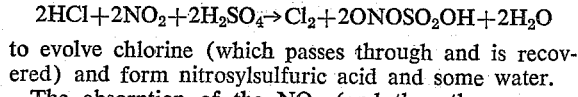

to evolve chlorine (which passes through and is recovered) and form nitrosylsulfuric acid and some water.

The absorption of the $NO_2$ (and the other gases—NOCl and HCl) in the $H_2SO_4$ is continued until from 10% to 40% of the sulfuric acid has been converted to nitrosylsulfuric acid (and preferably about 15% to 20%). At this point, the solution of $ONOSO_2OH$ in $H_2SO_4$ is passed on to the third step of the process.

Nitrosylsulfuric acid is the well-known "chamber crystals" compound encountered in the chamber process for the manufacture of sulfuric acid. This compound is very soluble in sulfuric acid. Sulfuric acid, in concentrations between 59.5% and 100.0% $H_2SO_4$ will readily dissolve $NO_2$, to form nitric acid and nitrosylsulfuric acid. Up to 10% $ONOSO_2OH$ will dissolve without discoloration of the $H_2SO_4$. In concentrations between 10% to 40% $ONOSO_2OH$ in the $H_2SO_4$, the solution is yellow in color.

Solutions of $ONOSO_2OH$ in $H_2SO_4$ (above 59.5% concentration) are remarkably stable, and will not decompose even on boiling the solution. The reaction:

$$H_2SO_4 + 2NO_2 \rightleftharpoons HNO_3 + ONOSO_2OH$$

is an equilibrium and all four compounds are present in the equilibrium mixture. When sulfuric acid of 90%–100% $H_2SO_4$ concentration is employed, the equilibrium is almost completely shifted to the right, and the reaction products are almost entirely $HNO_3$ and $ONOSO_2OH$.

THIRD STEP.—CONVERSION OF NITRIC ACID TO NITROSYLSULFURIC ACID

After from 10% to 40% of the sulfuric acid (and preferably from 15% to 20%) has been converted, in the second step, to nitrosylsulfuric acid, with the formation of an equivalent amount of nitric acid, the solution of $ONOSO_2OH$ and $HNO_3$ in the $H_2SO_4$ is passed on to the third step of the process. In this step, the nitric acid in the mixture is reacted with sulfur dioxide, to form an additional quantity of nitrosylsulfuric acid:

$$SO_2 + HNO_3 \rightarrow ONOSO_2OH$$

In view of the high stability of nitrosylsulfuric acid in sulfuric acid solution, this reaction of the $HNO_3$ with the $SO_2$ can be effected at any temperature range between 0° C. and the boiling point of the $HNO_3$-water azeotrope (i.e., 121° C.). However, it is preferred to effect the reaction of the $SO_2$ with the $HNO_3$ within the same temperature range as that employed in the scrubbing of the $NO_2$-chlorine gas mixture through the sulfuric acid, i.e., between 0° C. and 60° C., and preferably between 25° C. and 35° C.

The sulfur dioxide employed in this step may, of course, be pure sulfur dioxide from compressed or liquefied gas cylinders. However, for the industrial operation of this process, a sulfur dioxide gas may be employed such as is obtained by the oxidation of sulfur in standard sulfur burners, by the roasting of pyrites, blendes or other sulfur-containing ores, in the manufacture of Portland cement from gypsum or anhydrite or in fact from any other source of inexpensive sulfur dioxide-containing gas. Such gases may contain from 4.0% to 12.5% of $SO_2$ (the remainder being oxygen and nitrogen) and are suited for use in the process of this invention.

The sulfur dioxide-containing gas is passed through the solution of $ONOSO_2OH$ and $HNO_3$ in the $H_2SO_4$ until substantially all of the $HNO_3$ is converted to a further quantity of $ONOSO_2OH$. The reaction of $SO_2$ with the $HNO_3$ is catalyzed by the sulfuric acid and the small amount of water present in the reaction mixture.

The introduction of the $SO_2$ is interrupted when all of the $HNO_3$ has been converted to $ONOSO_2OH$. However, if a slight excess of $SO_2$ is inadvertently introduced, no damage is in effect done, since the excess of $SO_2$ simply reduces the nitrosylsulfuric acid:

$$2ONOSO_2OH + SO_2 + 2H_2O \rightarrow 3H_2SO_4 + 2NO$$

The NO formed is evolved (and may optionally be recycled to the first step of the process, where it is oxidized to $NO_2$ and recycled to the process). However, it is desirable to introduce the $SO_2$ not beyond the point where the $HNO_3$ is completely converted to $ONOSO_2OH$.

The reaction of $SO_2$ with $HNO_3$ to form nitrosylsulfuric acid is exothermic. However, it is not as a rule necessary to cool the reaction mixture in view of the great stability of solutions of $ONOSO_2OH$ in $H_2SO_4$.

FOURTH STEP.—CONVERSION OF NITROSYL-SULFURIC ACID TO NITROSYL CHLORIDE

Nitrosylsulfuric acid will readily react with gaseous HCl to form nitrosyl chloride and $H_2SO_4$ $$ONOSO_2OH + HCl \rightarrow NOCl + H_2SO_4$$

This reaction may be effected at any temperature above the boiling point of NOCl (minus 5.5° C.) but below the boiling point of the sulfuric acid in which the nitrosylsulfuric acid is dissolved. It is preferred to effect this reaction at a temperature between 50° C. and 75° C., preferably about 55° C. to 60° C. The hydrogen chloride gas is introduced into the solution of the $ONOSO_2OH$ in the $H_2SO_4$ (obtained from the third step of the process). As rapidly as the HCl is introduced, it reacts with the $ONOSO_2OH$ and evolves nitrosyl chloride. The NOCl (which will also contain minor amounts of entrained unreacted HCl) is passed directly to the first step of the process. Preferably, it is first passed through a heat-exchange unit (as described above) and preheated with the effluent gases from the exothermic oxidation of the NOCl of the first step.

The nitrosylsulfuric acid is thus converted, substantially quantitatively, to NOCl and $H_2SO_4$. The NOCl formed will contain minor amounts (up to 15% by volume) of entrained, unreacted HCl, and is recycled to the first step of the process.

After all of the $ONOSO_2OH$ in the $H_2SO_4$ has reacted, the resultant residual sulfuric acid will contain an additional quantity of $H_2SO_4$ equivalent to the molar quantity of $SO_2$ introduced into the cyclic process in the third step. This additional quantity of $H_2SO_4$ is withdrawn and the remaining $H_2SO_4$ is recycled to the second step of the process.

Thus, it is entirely feasible and practical to operate this process on a continuous basis, although this is by no means essential.

In carrying out the process of this invention, two absorber-reactor units may be operated in parallel. While one absorber-reactor unit is employed as an absorber (to absorb the $NO_2$ from the oxidized gas mixture of the first step), the second absorber-reactor unit is employed as a reactor (for the reaction of the $HNO_3$ with the $SO_2$, and then for the reaction of the $ONOSO_2OH$ with the HCl). When the absorber unit has absorbed the optimum amount of $NO_2$, and the mixture in the reactor unit has been completely converted to $ONOSO_2OH$ and then to NOCl, and the excess $H_2SO_4$ has been withdrawn, the units are reversed with the absorber unit now becoming a reactor and the reactor unit becoming an absorber. A continuous stream of NOCl from the two units in parallel is fed to the oxidation unit (through a heat-exchange unit) and the effluent oxidation gas is fed first to one and then to the other of the two absorber-reactor units in parallel.

Nitrogen dioxide, as used in the process of this invention, exists in the gaseous state as a mixture of $NO_2$ and the dimeric $N_2O_4$ of varying proportions. In the liquid state, it exists largely as $N_2O_4$. Between its boiling point (21° C.) and 140° C., it exists as mixtures of $NO_2$ and $N_2O_4$. Above 140° C., it exists largely as $NO_2$. It is therefore understood that the term nitrogen dioxide ($NO_2$) as employed in the specification and claims of this application, refers to $N_2O_4$ (dinitrogen tetroxide) as well as to $NO_2$ and to mixtures of these two forms. $N_2O_4$ reacts exactly as does $NO_2$ in the process of this invention and may be considered as its complete functional equivalent.

The following examples will better illustrate the nature of the present invention; however, the invention is not intended to be limited to these examples. Parts are by weight unless otherwise indicated.

*Example I*

A reaction tube filled with Raschig rings, and maintained at a temperature of about 400° C., is fed, per hour, with a gas mixture of 44.8 liters of NOCl (131.0 gms.), 4.5 liters of gaseous HCl (recycle with NOCl) (7.3 gms.) and 17.9 liters of oxygen (25.6 gms.), the space velocity through the tube being about 250.

The effluent gases, per hour, contain 73.6 gms. of $NO_2$ (1.6 moles), 56.8 gms. of chlorine (0.8 mole), 26.2 gms. of unreacted NOCl (0.4 mole) and 7.3 gms. of HCl.

The effluent gases are now absorbed in one kilo of 100% sulfuric acid, maintained at a temperature between 25°–35° C. The conversion will yield about 150–152 gms. of nitrosylsulfuric acid; 75–78 gms. of chlorine and 50–51 gms. of $HNO_3$ per hour. The nitrosylsulfuric acid and the nitric acid remain dissolved in the sulfuric acid, while the chlorine passes through and is recovered.

At the conclusion of the one hour absorption period, the solution of $ONOSO_2OH$ and $HNO_3$ in sulfuric acid is treated, at a temperature between 25° C. and 35° C. with a stream of sulfur dioxide from a sulfur burner, containing about 8.5% $SO_2$, until a total of 51.0–51.5 gms. of $SO_2$ (0.8 mole) has been absorbed. The sulfuric acid solution will now contain the equivalent of about 250–254 gms. of nitrosylsulfuric acid.

The solution of $ONOSO_2OH$ in the $H_2SO_4$ is now heated to a temperature between 55° C. and 60° C., while gaseous hydrogen chloride is introduced at the rate of 49.3 liters (80.3 gms.) per hour. Nitrosyl chloride, admixed with a little unreacted HCl, is evolved, at the rate of 44.8 liters of NOCl (131.0 gms.) and 4.5 liters of recycle HCl (7.3 gms.) per hour. This gas mixture (after being preheated through a heat-exchange unit) is fed continuously to the oxidation reaction tube in the first step.

After all of the $ONOSO_2OH$ has been reacted with the HCl, the residual sulfuric acid weighs about 1075 gms. Seventy five grams of this sulfuric acid is drawn off and the remaining 1 kg. is returned to the process.

Thus, 75–78 gms. of chlorine and 75 gms. of 95%–98% sulfuric acid are obtained from an hourly feed of 80.3 gms. of hydrogen chloride, 51.0–51.5 gms. of sulfur dioxide and 25.6 gms. of oxygen.

*Example II*

A reaction tube, filled with ceramic bubble plates and maintained at a temperature of about 425° C. is fed, per hour, with a gas mixture of 44.8 liters of NOCl (131.0 gms.), 4.5 liters of gaseous HCl (recycle with NOCl) (7.3 gms.) and 90.0 liters of air, the space velocity through the tube being about 350. The effluent gases, per hour, contain about 73.6 gms. of $NO_2$ (1.6 moles), 56.5 gms. of chlorine (0.8 mole) (as a stream of about 13.0% $Cl_2$ concentration), 26.0 gms. of unreacted NOCl (0.4 mole) and 7.3 gms. of HCl.

The effluent gases are now absorbed in one kilo of 100% sulfuric acid, maintained at a temperature between 30° C. and 35° C. This absorption will yield about 148–151 gms. of nitrosylsulfuric acid, 74–75 gms. of chlorine and 50–51 gms. of $HNO_3$ per hour. The nitrosylsulfuric acid and the nitric acid remain dissolved, while the chlorine passes through and is recovered as a gas stream containing 19.0%–19.5% by volume of chlorine.

At the conclusion of the one hour absorption period, the solution of $ONOSO_2OH$ and $HNO_3$ in sulfuric acid is treated at a temperature maintained between 30° C. and 35° C., with a stream of sulfur dioxide containing about 8.0% $SO_2$ until a total of 51.5 gms. of $SO_2$ (0.8 mole) has been absorbed. The sulfuric acid solution will now contain the equivalent of about 250–255 gms. of nitrosylsulfuric acid.

The solution of $ONOSO_2OH$ in the $H_2SO_4$ is now heated to a temperature between 55° C. and 60° C., while gaseous hydrogen chloride is introduced at the rate of 49.3 liters (80.3 gms.) per hour. Nitrosyl chloride, admixed with a little unreacted HCl, is evolved at the rate of 44.8 liters of NOCl (131.0 gms.) and 4.5 liters of recycle HCl (7.3 gms.) per hour. This gas mixture (after being preheated through a heat-exchange unit) is fed continuously to the oxidation reaction tube in the first step.

After all the $ONOSO_2OH$ has been reacted with the HCl, the residual sulfuric acid weighs about 1072 gms. Seventy two grams of this sulfuric acid are withdrawn and the remaining 1 kg. is returned to the process.

Thus, 74–75 gms. of chlorine (as a gas stream containing 19% $Cl_2$) and 72 gms. of 96% sulfuric acid are obtained from an hourly feed of 80.3 gms. of hydrogen chloride, 51.5 gms. of sulfur dioxide and 90 liters of air. The sulfuric acid formed is slightly diluted by the minor amounts of water formed in the second step (in the course of the absorption of the minor amounts of NOCl and HCl present in the oxidation gases from the first step). It is entirely feasible to withdraw a minor amount of this slightly diluted $H_2SO_4$ and to replace it with oleum or sulfur trioxide, to reconstitute the original absorbing acid.

As many widely different embodiments of this invention may be made without departing from the spirit and scope thereof, it is to be understood that this invention is not limited to the specific embodiments thereof except as defined in the appended claims.

What is claimed is:

1. A cyclic process for the conversion of hydrogen chloride and sulfur dioxide to chlorine and sulfuric acid which comprises the steps of (*a*) oxidizing nitrosyl chloride with an oxygen-containing gas to obtain a mixture of nitrogen dioxide and chlorine; (*b*) reacting the said mixture of nitrogen dioxide and chlorine with sulfuric acid, whereby the chlorine is recovered and the nitrogen dioxide reacts with the sulfuric acid to form a mixture of nitrosylsulfuric acid and nitric acid in sulfuric acid; (*c*) reacting the said mixture of nitrosylsulfuric acid and nitric acid in sulfuric acid with sulfur dioxide in quantity sufficient to convert the nitric acid in said mixture to nitrosylsulfuric acid; (*d*) reacting the said nitrosylsulfuric acid in sulfuric acid with hydrogen chloride to form nitrosyl chloride which is recycled to step (*a*) of said process, and sulfuric acid, at least a part of which is recycled to step (*b*) of said process.

2. The process of claim 1 in which the oxidation of the nitrosyl chloride in step (*a*) is effected with oxygen.

3. The process of claim 1 in which the oxidation of the nitrosyl chloride in step (*a*) is effected with air.

4. The process of claim 1 in which the oxidation of the nitrosyl chloride in step (*a*) is effected at a temperature between 20° C. and 190° C. in the presence of a catalyst.

5. The process of claim 1 in which the oxidation of the nitrosyl chloride in step (*a*) is effected at a temperature between 190° C. and 500° C. in the absence of a catalyst.

6. The process of claim 1 in which the oxidation of the nitrosyl chloride in step (*a*) is effected at a temperature between 190° C. and 500° C. in the presence of a catalyst.

7. The process of claim 1 in which the oxidation of the nitrosyl chloride in step (*a*) is effected at a temperature between 300° C. and 450° C. in the absence of a catalyst.

8. The process of claim 1 in which the oxidation of the nitrosyl chloride in step (*a*) is effected with a stoichiometric deficit of oxygen and the mixture of nitrogen dioxide and chlorine also contains unreacted nitrosyl chloride and hydrogen chloride.

9. The process of claim 1 in which the concentration of sulfuric acid used in step (*b*) is from 59.5% to 100.0%.

10. The process of claim 1 in which the concentration of sulfuric acid used in step (*b*) is from 90.0% to 100.0%.

11. The process of claim 1 in which the mixture of nitrogen dioxide and chlorine is reacted with the sulfuric acid in step (*b*) at a temperature between 0° C. and 60° C.

12. The process of claim 1 in which the mixture of nitrogen dioxide and chlorine is reacted with the sulfuric acid in step (*b*) at a temperature between 25° C. and 35° C.

13. The process of claim 1 in which the mixture of nitrogen dioxide and chlorine is reacted with the sulfuric acid in step (*b*) until 10% to 40% of the said sulfuric acid has been converted to nitrosylsulfuric acid.

14. The process of claim 1 in which the mixture of nitrogen dioxide and chlorine is reacted with the sulfuric acid in step (*b*) until 15% to 20% of the said sulfuric acid has been converted to nitrosylsulfuric acid.

15. The process of claim 1 in which the mixture of nitrosylsulfuric acid and nitric acid in sulfuric acid in step (*c*) is reacted with sulfur dioxide at a temperature between 0° C. and 121° C.

16. The process of claim 1 in which the mixture of nitroslysulfuric acid and nitric acid in sulfuric acid in step (c) is reacted with sulfur dioxide at a temperature between 0° C. and 60° C.

17. The process of claim 1 in which the mixture of nitroslysulfuric acid and nitric acid in sulfuric acid in step (c) is reacted with sulfur dioxide at a temperature between 25° C. and 35° C.

18. The process of claim 1 in which the mixture of nitroslysulfuric acid and nitric acid in sulfuric acid in step (c) is reacted with sulfur dioxide in quantity sufficient to convert the nitric acid in said mixture to nitrosylsulfuric acid.

19. The process of claim 1 in which the mixture of nitrosylsulfuric acid and sulfuric acid is reacted with hydrogen chloride in step (d) at a temperature above minus 5.5° C. but below the boiling point of said sulfuric acid.

20. The process of claim 1 in which the mixture of nitrosylsulfuric acid and sulfuric acid is reacted with hydrogen chloride in step (d) at a temperature between 50° C. and 75° C.

21. The process of claim 1 in which the mixture of nitrosylsulfuric acid and sulfuric acid is reacted with hydrogen chloride in step (d) at a temperature between 55° C. and 60° C.

22. The process of claim 1 operated as a continuous process.

References Cited in the file of this patent

UNITED STATES PATENTS

| | | |
|---|---|---|
| 1,310,943 | Datta | July 22, 1919 |
| 1,756,532 | Battegay | Apr. 29, 1930 |
| 2,087,278 | Crittenden | July 20, 1937 |
| 2,297,281 | Beekhois | Sept. 29, 1942 |
| 2,878,105 | Walter | Mar. 17, 1959 |

OTHER REFERENCES

Gordon: Article in Chemical Engineering, May 1953, pages 187–192 TN1.M45.

Jacobson: "Encyclopedia of Chemical Reactions," vol. VII, 1958, page 52.

Mellor: "Comprehensive Treatise on Inorganic and Theoretical Chemistry," vol. 8, 1928, page 698.